(12) United States Patent
Han et al.

(10) Patent No.: US 12,334,268 B2
(45) Date of Patent: Jun. 17, 2025

(54) MULTILAYER ELECTRONIC COMPONENT

(71) Applicant: SAMSUNG ELECTRO-MECHANICS CO., LTD., Suwon-si (KR)

(72) Inventors: Ji Hye Han, Suwon-si (KR); Jung Min Kim, Suwon-si (KR); Hong Je Choi, Suwon-si (KR); Byung Woo Kang, Suwon-si (KR); Hye Jin Park, Suwon-si (KR); Sang Wook Lee, Suwon-si (KR); Bon Seok Koo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 97 days.

(21) Appl. No.: 17/978,660

(22) Filed: Nov. 1, 2022

(65) Prior Publication Data

US 2023/0197344 A1    Jun. 22, 2023

(30) Foreign Application Priority Data

Dec. 20, 2021    (KR) .................. 10-2021-0182663

(51) Int. Cl.
*H01G 4/30* (2006.01)
*H01G 4/232* (2006.01)

(52) U.S. Cl.
CPC ............. *H01G 4/2325* (2013.01); *H01G 4/30* (2013.01)

(58) Field of Classification Search
CPC ......... H01G 4/2325; H01G 4/30; H01G 4/232
(Continued)

(56) References Cited

U.S. PATENT DOCUMENTS

| 10,186,378 B2 | 1/2019 | Hamanaka et al. |
| 2014/0204502 A1* | 7/2014 | Chun ............... H01G 4/30 |
| | | 361/301.4 |

(Continued)

FOREIGN PATENT DOCUMENTS

| JP | 2013069713 A | * 4/2013 |
| KR | 10-2017-0118584 A | 10/2017 |

(Continued)

OTHER PUBLICATIONS

Korean Office Action dated Apr. 30, 2025 issued in Korean Patent Application No. 10-2021-0182663 (with English translation).

(Continued)

*Primary Examiner* — Arun Ramaswamy
(74) *Attorney, Agent, or Firm* — Morgan Lewis & Bockius LLP

(57) ABSTRACT

A multilayer electronic component includes a body including a dielectric layer and a plurality of internal electrodes stacked with the dielectric layer interposed therebetween and external electrodes disposed outside the body, wherein the external electrodes include a first electrode layer connected to the internal electrodes and including a conductive metal, a first resin electrode layer disposed on the first electrode layer and including a first conductive connecting portion including an intermetallic compound and a resin and a second resin electrode layer disposed on the first resin electrode layer and including a plurality of metal particles and a resin.

22 Claims, 9 Drawing Sheets

(58) Field of Classification Search
USPC .................. 361/301.4, 321.1, 321.3, 306.3
See application file for complete search history.

(56) References Cited

U.S. PATENT DOCUMENTS

| | | | |
|---|---|---|---|
| 2015/0162132 A1* | 6/2015 | Kwag | H01G 4/2325 |
| | | | 361/301.4 |
| 2015/0279566 A1* | 10/2015 | Otani | H01G 4/008 |
| | | | 361/301.4 |
| 2017/0032896 A1* | 2/2017 | Otani | H01G 4/30 |
| 2017/0301468 A1 | 10/2017 | Kim et al. | |
| 2018/0166215 A1* | 6/2018 | Hamanaka | H01G 4/12 |
| 2021/0043385 A1* | 2/2021 | Nagai | H01G 4/248 |
| 2021/0050152 A1* | 2/2021 | Zenzai | H05K 1/092 |

FOREIGN PATENT DOCUMENTS

| | | |
|---|---|---|
| KR | 10-2018-0066851 A | 6/2018 |
| KR | 10-2018-0084030 A | 7/2018 |
| KR | 10-2019-0004631 A | 1/2019 |
| KR | 10-1941954 B1 | 1/2019 |

OTHER PUBLICATIONS

Korean Office Action dated Apr. 10, 2025 issued in Korean Patent Application No. 10-2021-0182663 (with English translation).

* cited by examiner

MULTILAYER ELECTRONIC COMPONENT

CROSS-REFERENCE TO RELATED APPLICATION(S)

This application claims benefit of priority to Korean Patent Application No. 10-2021-0182663 filed on Dec. 20, 2021 in the Korean Intellectual Property Office, the disclosure of which is incorporated herein by reference in its entirety.

BACKGROUND

1. Technical Field

The present disclosure relates to a multilayer electronic component.

2. Description of Related Art

A multilayer ceramic capacitor (MLCC), a multilayer electronic component, is a chip-type capacitor mounted on the printed circuit boards of various types of electronic products such as imaging devices including liquid crystal displays (LCDs) and plasma display panels (PDPs), computers, smartphones, cell phones, and the like, to allow electricity to be charged therein and discharged therefrom.

Such MLCCs, due to advantages thereof, such as compactness, guaranteed high capacitance, and ease of mountability, are important chip components used in industries such as communications, computers, home appliances, and automobiles, and in particular, are key passive elements used in various electric, electronic, and information and communications devices, such as mobile phones, computers, and digital TVs.

In recent years, MLCCs have also been miniaturized and have higher capacity as electronic devices are miniaturized and have higher performance, and with this trend, the importance of securing high reliability of MLCCs has increased.

As a measure to secure the high reliability of MLCCs, a technology of applying a resin electrode layer to external electrodes to absorb tensile stress occurring in a mechanical or thermal environment to prevent cracks caused by stress has been disclosed.

This resin electrode layer serves to electrically and mechanically bond a sintered electrode layer and a plating layer of an external electrode of the MLCC and protect the MLCC from mechanical and thermal stress depending on a process temperature and bending impact of a board during circuit board mounting.

However, when the conductive resin layer is applied in a high-temperature reflow environment, an interface between the sintered electrode layer and the resin electrode layer may be lifted due to outgassing generated in the conductive resin layer. In addition, in the case of the resin electrode layer, metal particles having conductivity are distributed in the conductive resin layer to secure electrical conductivity by hopping conduction, and thus, electrical conductivity between the sintered electrode layer and the conductive resin layer may be degraded.

In order to solve this problem, Patent Document 1 discloses a resin electrode layer including an intermetallic compound in order to improve electrical and mechanical bonding strength between the sintered electrode layer and the conductive resin layer. By bonding with the intermetallic compound, the connectivity between the sintered electrode layer and the resin electrode layer was improved and lifting at the interface was prevented.

However, as the connectivity between the sintered electrode layer and the resin electrode layer is increased by the intermetallic compound, the rigidity of the external electrode increases, and accordingly, flexural strength of the multilayer ceramic capacitor decreases.

SUMMARY

Exemplary embodiments provide a multilayer electronic component in which a problem of lifting at an interface between a sintered electrode layer and a resin electrode layer occurs due to outgas occurring at the resin electrode layer when reflow is applied is solved.

Exemplary embodiments provide a multilayer electronic component in which a problem of degraded electrical connectivity of a resin electrode layer is solved by securing electrical connectivity by hopping conduction.

Exemplary embodiments provide a multilayer electronic component in which a problem of degrading flexural strength due to an increase in rigidity of a resin electrode layer including an intermetallic compound is solved.

According to an aspect of the present disclosure, a multilayer electronic component includes: a body including a dielectric layer and a plurality of internal electrodes stacked with the dielectric layer interposed therebetween; and external electrodes disposed outside the body, wherein the external electrodes include a first electrode layer connected to the internal electrodes and including a first conductive metal, a first resin electrode layer disposed on the first electrode layer and including a first conductive connecting portion including a first intermetallic compound and a first resin; and a second resin electrode layer disposed on the first resin electrode layer and including a plurality of second metal particles and a second resin.

According to another aspect of the present disclosure, a multilayer electronic component includes: a body including a dielectric layer and a plurality of internal electrodes stacked with the dielectric layer interposed therebetween; and external electrodes disposed outside the body, wherein the external electrodes include a first electrode layer connected to the internal electrodes and including a first conductive metal, a first resin electrode layer disposed on the first electrode layer and including a first conductive connecting portion including a first intermetallic compound and a first resin, and a second resin electrode layer disposed on the first resin electrode layer and including a plurality of second metal particles and a second resin, wherein an end of the first electrode layer extends beyond an end of the second resin electrode layer.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
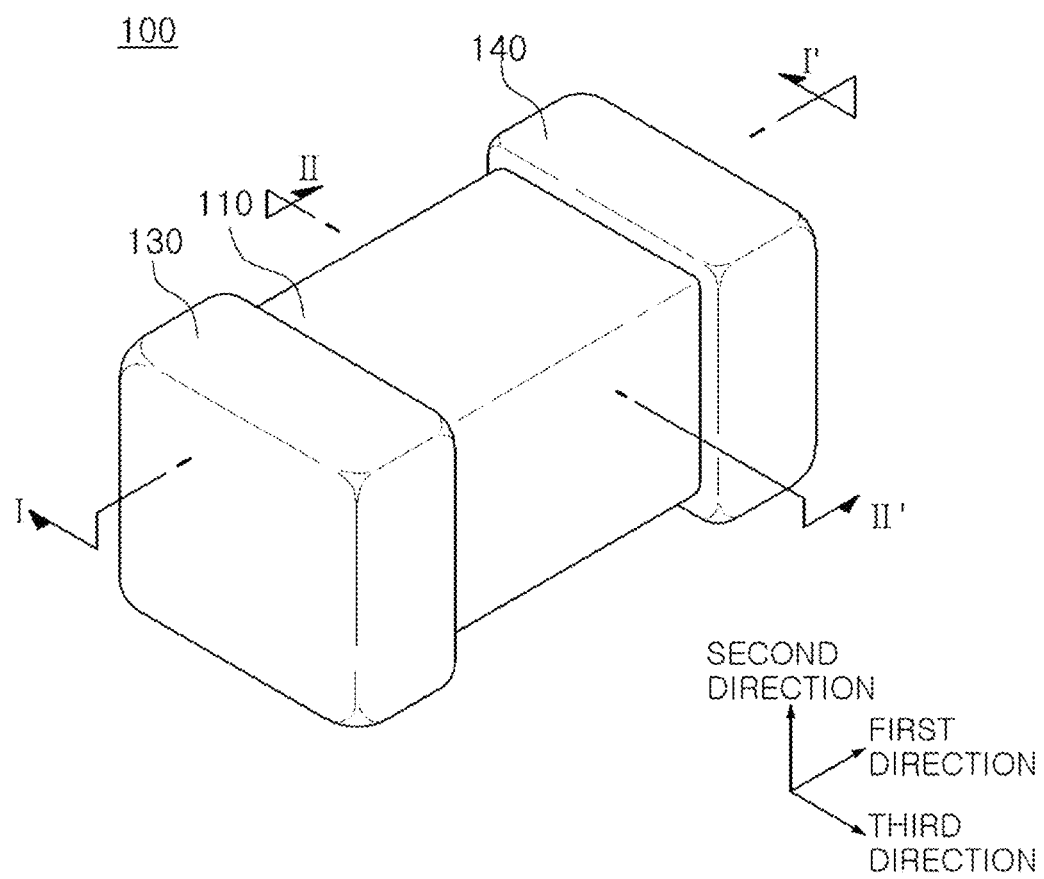
FIG. 1 is a schematic perspective view of a multilayer electronic component according to an exemplary embodiment in the present disclosure.

Hereinafter, exemplary embodiments of the present inventive concept will be described in detail with reference to the accompanying drawings. The inventive concept may, however, be exemplified in many different forms and should not be construed as being limited to the specific exemplary embodiments set forth herein. Rather, these exemplary embodiments are provided so that this disclosure will be thorough and complete, and will fully convey the scope of the inventive concept to those skilled in the art. In the drawings, the shapes and dimensions of elements may be exaggerated for clarity, and the same reference numerals will be used throughout to designate the same or like elements.

To clarify the present disclosure, portions irrespective of description are omitted and like numbers refer to like elements throughout the specification, and in the drawings, the thickness of layers, films, panels, regions, etc., are exaggerated for clarity. Also, in the drawings, like reference numerals refer to like elements although they are illustrated in different drawings. Throughout the specification, unless explicitly described to the contrary, the word "comprise" and variations such as "comprises" or "comprising", will be understood to imply the inclusion of stated elements but not the exclusion of any other elements In the drawings, a first direction may be defined as a length (L) direction, a second direction may be defined as a thickness (T) direction or a stacking direction, and a third direction may be defined as a width (W) direction.

FIG. 1 is a schematic perspective view of a multilayer electronic component according to an exemplary embodiment in the present disclosure.

Figure 2:
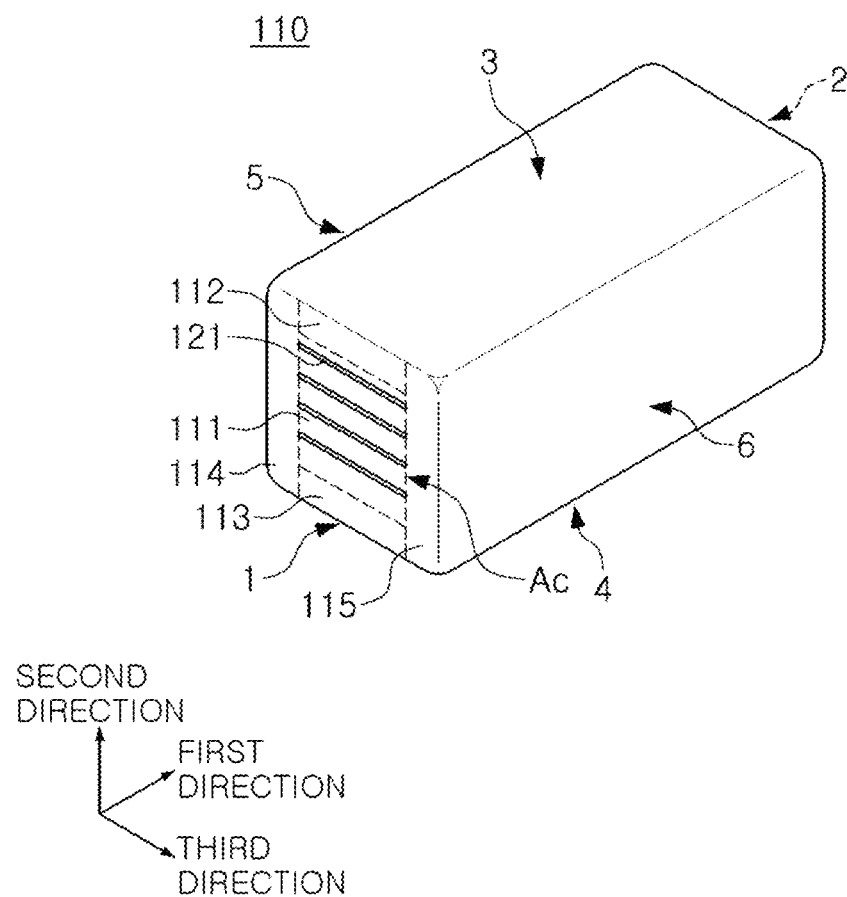
FIG. 2 is a schematic perspective view of a body of the multilayer electronic component of FIG. 1.

FIG. 2 is a schematic perspective view of a body of the multilayer electronic component of FIG. 1.

Figure 3:
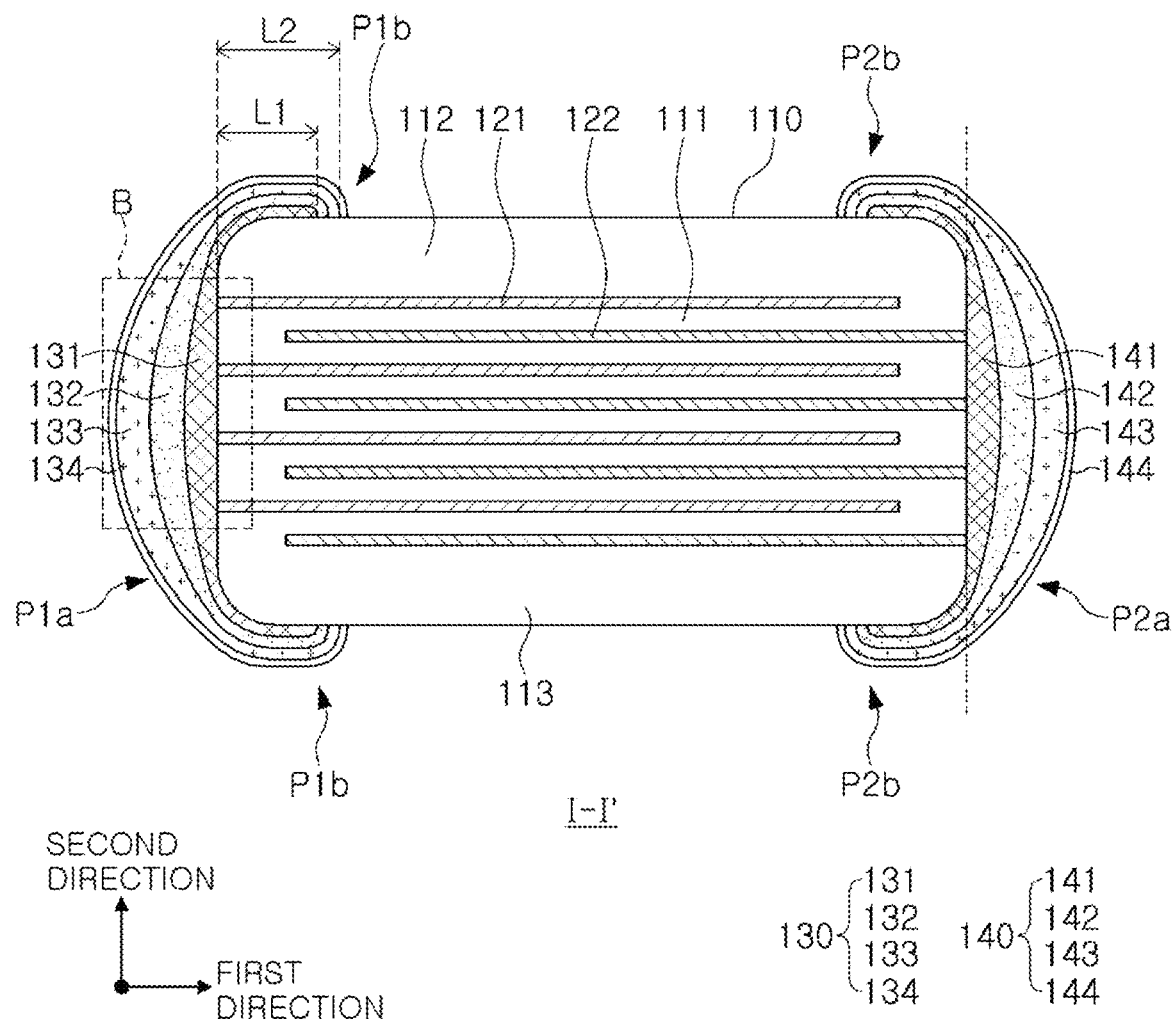
FIG. 3 is a schematic cross-sectional view taken along line I-I' of FIG. 1.

FIG. 3 is a schematic cross-sectional view taken along line I-I' of FIG. 1.

Figure 4:
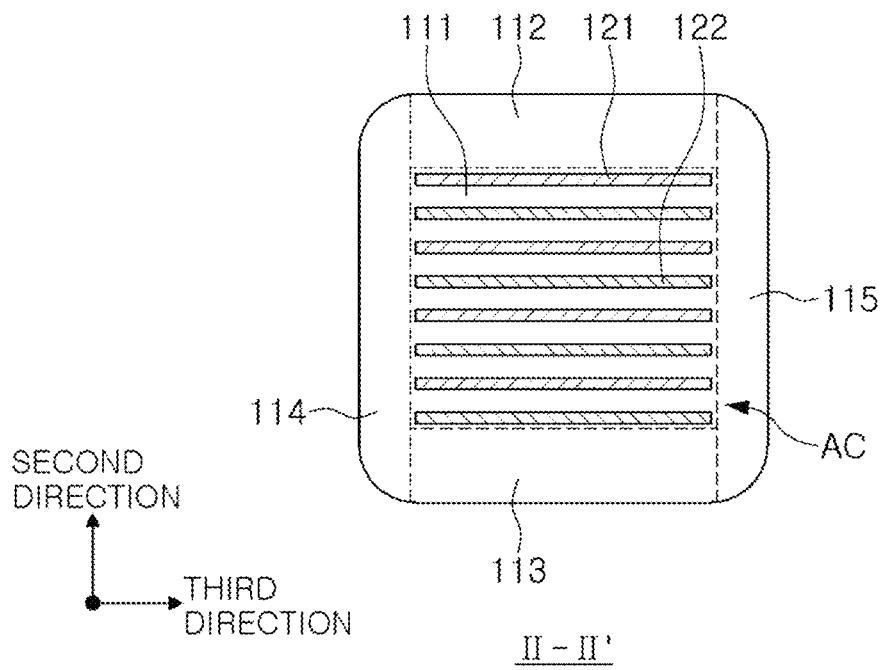
FIG. 4 is a schematic cross-sectional view taken along line II-II' of FIG. 1.

FIG. 4 is a schematic cross-sectional view taken along line II-II' of FIG. 1.

Figure 5:
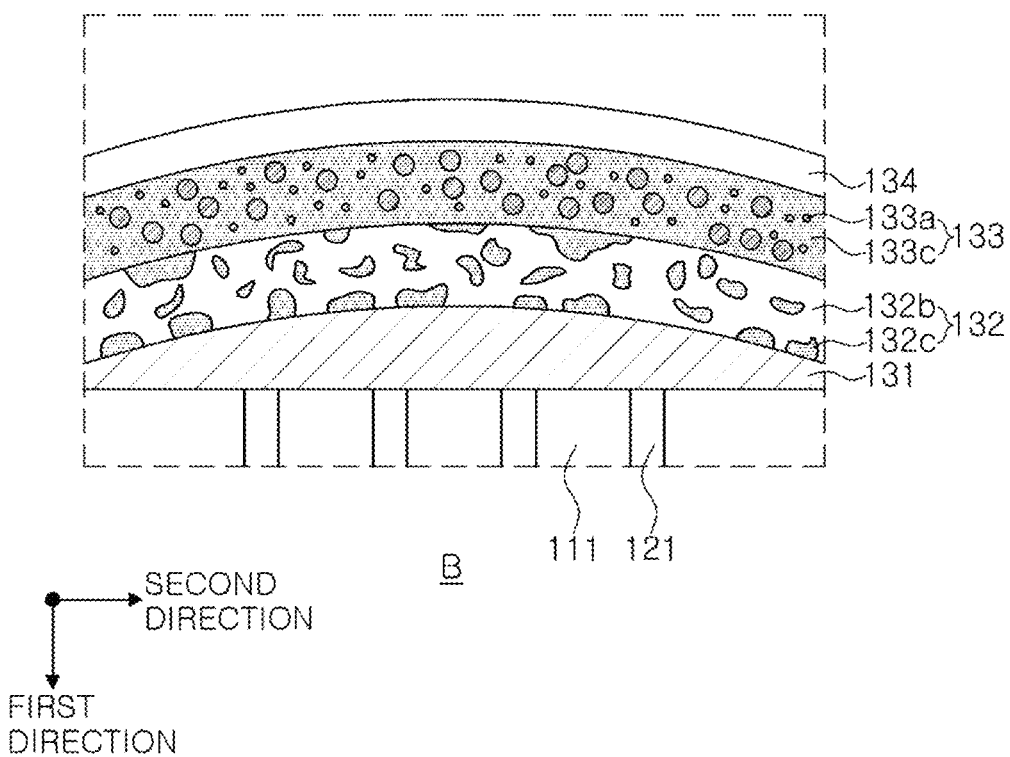
FIG. 5 is an enlarged view schematically illustrating region B of FIG. 3.

FIG. 5 is an enlarged view schematically illustrating region B of FIG. 3.

Figure 6:
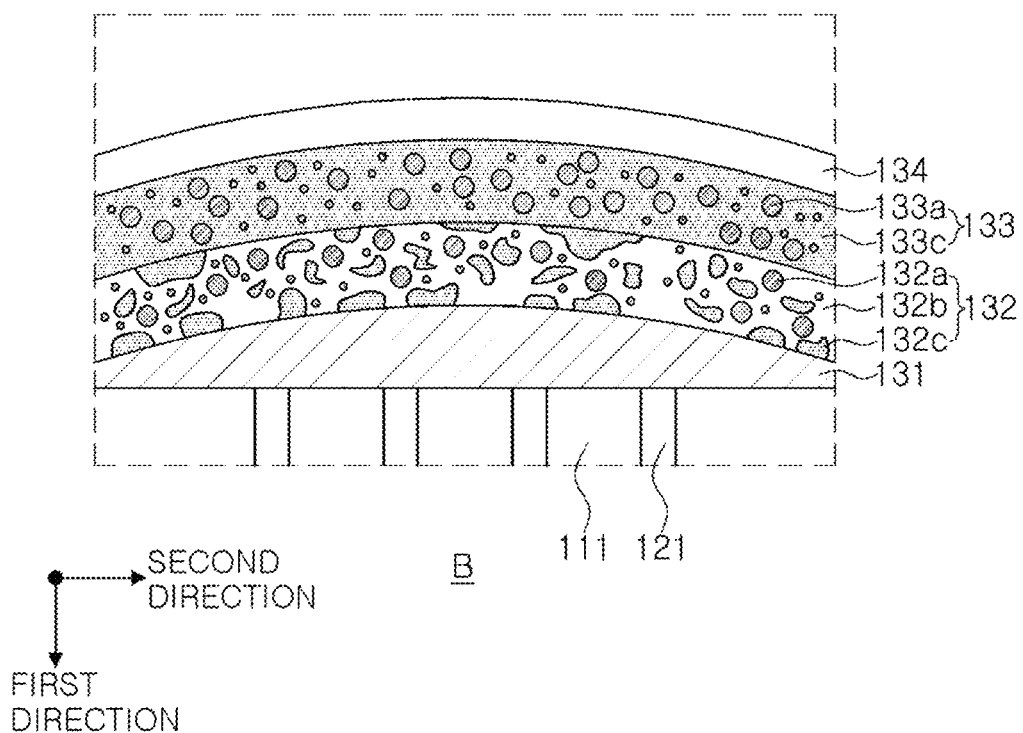
FIG. 6 is an enlarged view of region B according to an exemplary embodiment in the present disclosure.

FIG. 6 is an enlarged view of region B according to an exemplary embodiment in the present disclosure.

Figure 7:
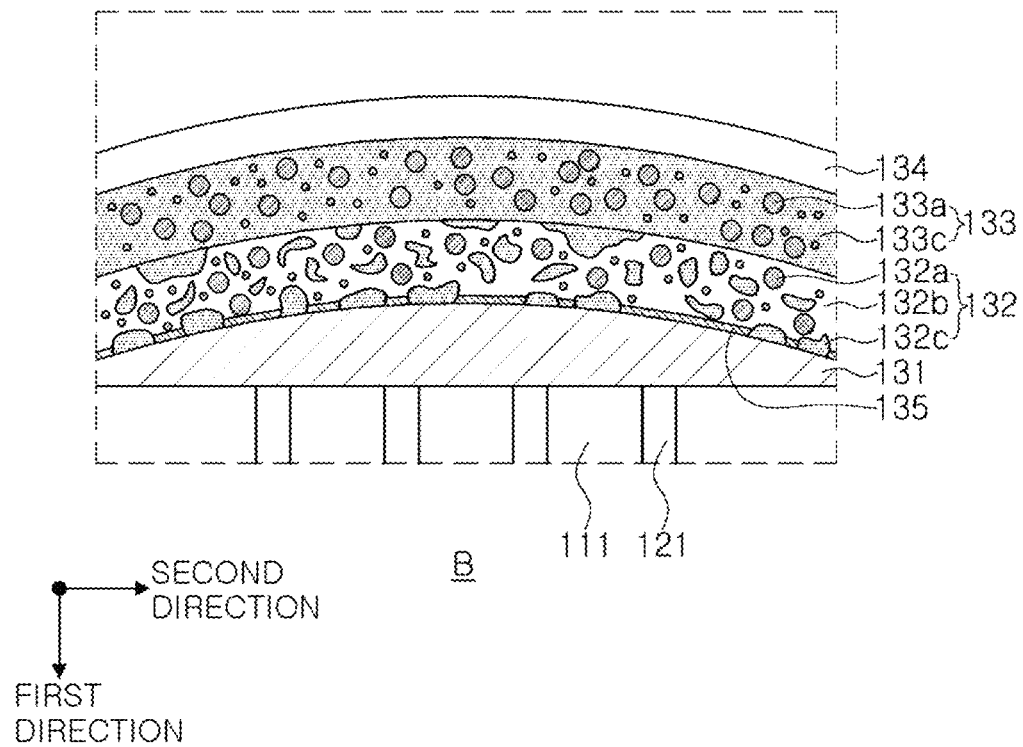
FIG. 7 is an enlarged view of region B according to an exemplary embodiment in the present disclosure.

FIG. 7 is an enlarged view of region B according to an exemplary embodiment in the present disclosure.

Figure 8:
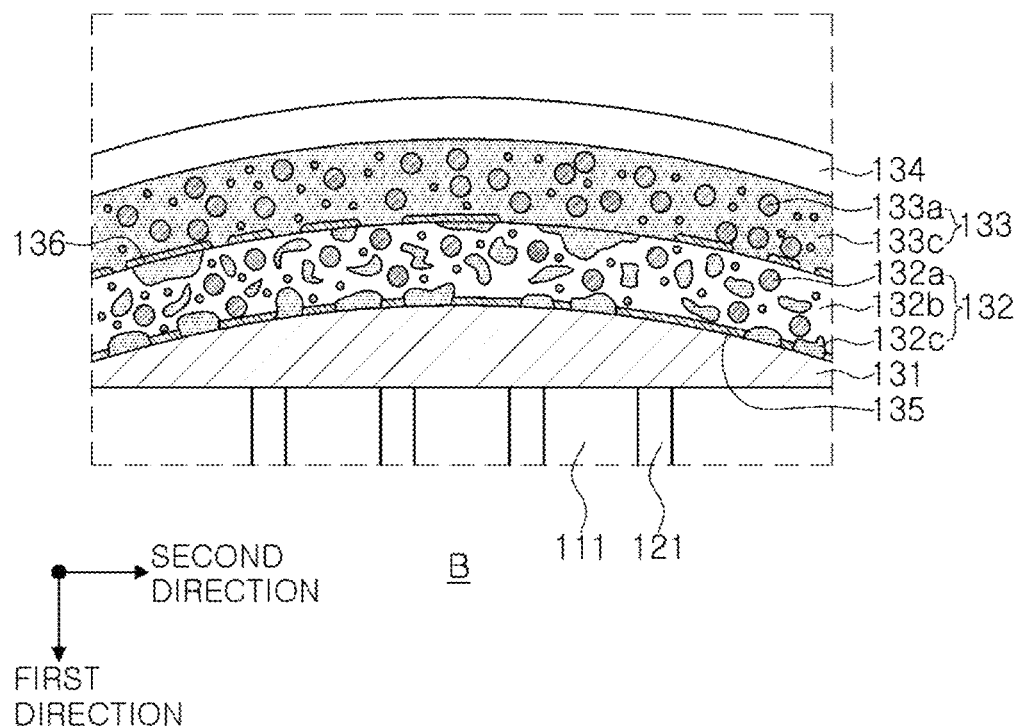
FIG. 8 is an enlarged view of region B according to an exemplary embodiment in the present disclosure.

FIG. 8 is an enlarged view of region B according to an exemplary embodiment in the present disclosure.

Figure 9:
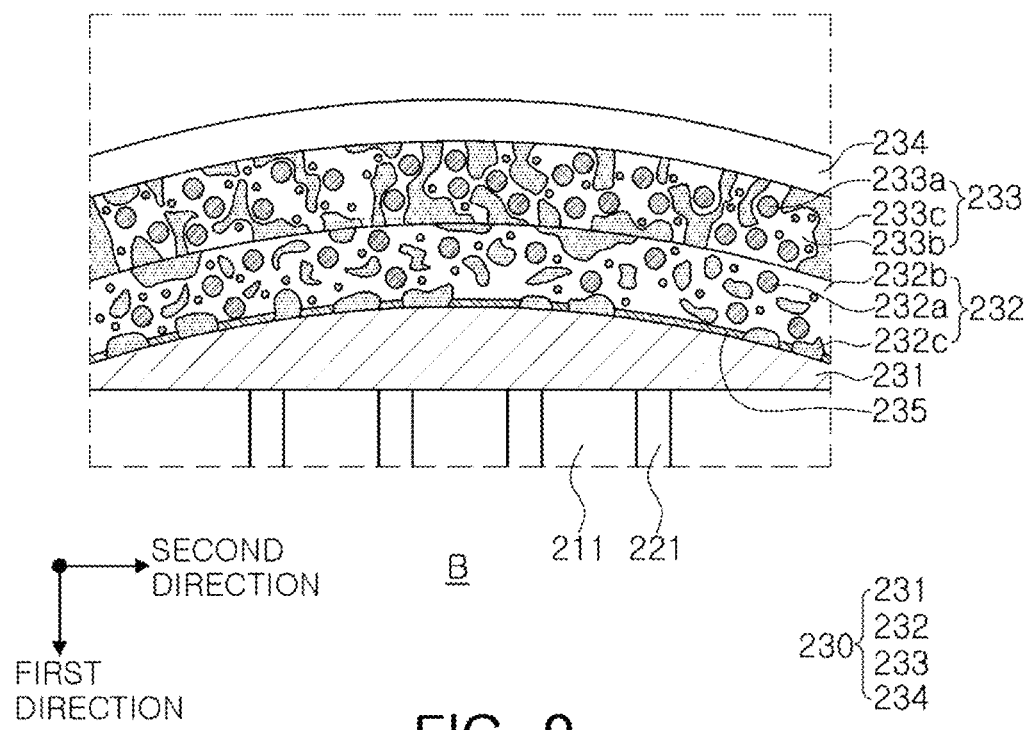
FIG. 9 is an enlarged view of region B according to an exemplary embodiment in the present disclosure.

FIG. 9 is an enlarged view of region B according to an exemplary embodiment in the present disclosure.

Figure 10:
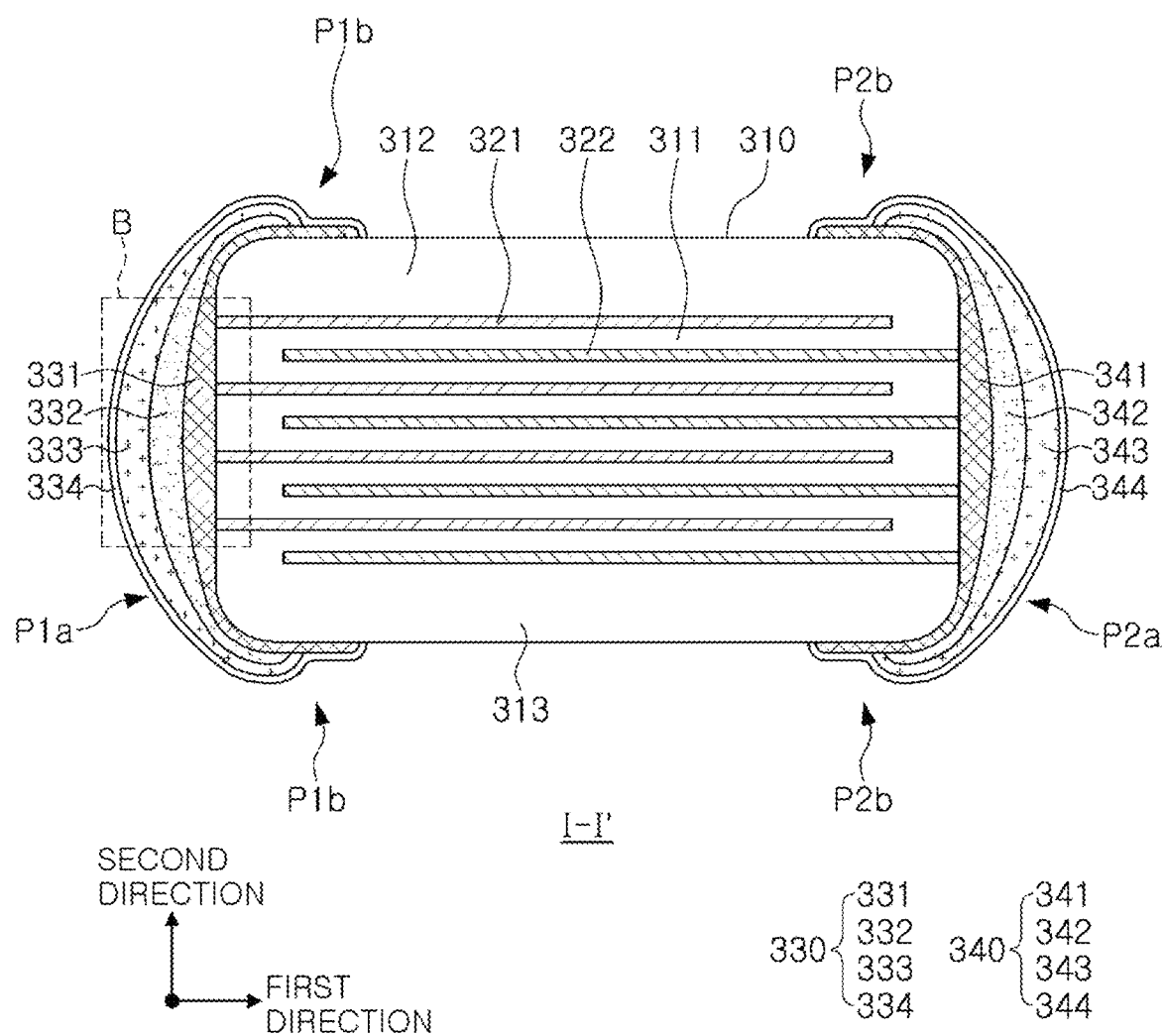
FIG. 10 is a cross-sectional view taken along line I-I' of FIG. 1 according to an exemplary embodiment in the present disclosure.

FIG. 10 is a cross-sectional view taken along line I-I' of FIG. 1 according to an exemplary embodiment in the present disclosure.

Referring to FIGS. 1 to 4, a multilayer electronic component 100 according to an exemplary embodiment in the present disclosure includes a body 110 including a dielectric layer 111 and a plurality of internal electrodes 121 and 122 stacked with the dielectric layer 111 therebetween and external electrodes 130 and 140 disposed outside the body 110, wherein the external electrodes 130 and 140 include first electrode layers 131 and 141 connected to the internal electrodes 121 and 122 and including a conductive metal, first resin electrode layers 132 and 142 disposed on the first electrode layers 131 and 141 and including first conductive connecting portions 132b and 142b including an intermetallic compound and resins 132c and 142c; and second resin electrode layers 133 and 143 disposed on the first resin electrode layers 132 and 142 and including a plurality of metal particles 133a and 143a and resins 133c and 134c.

As described above, when high-temperature reflow of the resin electrode layer is applied, an interface between a sintered electrode layer and the resin electrode layer may be lifted due to outgas occurring in the resin electrode layer. In addition, in the case of the resin electrode layer, the metal particles are dispersed in the resin electrode layer, so that electrical connectivity between the sintered electrode layer and the resin electrode layer may be deteriorated. In order to improve this, it may be considered to form a resin electrode layer including an intermetallic compound to secure bonding strength and electrical connectivity between the sintered electrode layer and the resin electrode layer. However, as the connectivity between the sintered electrode layer and the resin electrode layer increases, there may be a problem in that the flexural strength of the multilayer ceramic capacitor is lowered.

Meanwhile, the external electrodes 130 and 140 of the multilayer electronic component 100 according to an exemplary embodiment in the present disclosure may include the second resin electrode layers 133 and 143 disposed on the first resin electrode layers 132 and 142 including an intermetallic compound and having a mechanical strength lower than that of the first resin electrode layers 132 and 142, thereby improving flexural strength of the multilayer electronic component 100.

Hereinafter, each component included in the multilayer electronic component 100 according to an exemplary embodiment in the present disclosure will be described in more detail.

Although a specific shape of the body 110 is not particularly limited, as shown, the body 110 may have a hexahedral shape or a shape similar thereto. Due to the shrinkage of ceramic powder particles included in the body 110 or the polishing of the corner portions during or after a sintering process, the body 110 may not have a perfectly straight hexahedral shape but may have a substantially hexahedral shape.

The body 110 may include first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1, 2, 3, and 4 and opposing each other in the third direction.

In the body 110, the dielectric layer 111 and the internal electrodes 121 and 122 may be alternately stacked. The plurality of dielectric layers 111 forming the body 110 are in a sintered state, and adjacent dielectric layers 111 may be integrated such that boundaries therebetween may not be readily apparent without using a scanning electron microscope (SEM).

The dielectric layer 111 may be formed by sintering a ceramic green sheet including ceramic powder, an organic solvent, and a binder. The ceramic powder is not particularly limited as long as sufficient capacitance may be obtained. For example, a barium titanate ($BaTiO_3$)-based material, a strontium titanate ($SrTiO_3$)-based material, etc. may be used, but the present disclosure is not limited thereto.

In this case, a thickness of the dielectric layer 111 may be 10 μm or less in consideration of the size and capacitance of the body 110, and may be 0.6 μm or less, more preferably, 0.4 μm or less, for miniaturization and high capacitance of the multilayer electronic component 100, but the present disclosure is not limited thereto.

Here, the thickness of the dielectric layer may refer to an average thickness of the dielectric layer 111 disposed between the internal electrodes 121 and 122. The thickness of the dielectric layer may be measured by scanning the cross-sections of the body 110 in the first direction and the second direction with a scanning electron microscope (SEM) having a magnification of 10,000. More specifically, an average value may be measured by measuring the thickness at a plurality of points of one dielectric layer 111, for example, at 30 points equally spaced in the first direction. In addition, if the average value is measured by extending the measurement of the average value to a plurality of dielectric layers 111, the average thickness of the dielectric layer 111 may be more generalized.

The body 110 may include a capacitance forming portion Ac disposed inside the body 110 and including a plurality of first internal electrodes 121 and a plurality of second internal electrodes 122 disposed to face each other with the dielectric layer 111 interposed therebetween to form capacitance, a first cover portion 112 disposed on an upper surface of the capacitance forming portion Ac, and a second cover portion 113 disposed on a lower surface of the capacitance forming portion Ac.

The first cover portion 112 and the second cover portion 113 may be formed by stacking a single dielectric layer or two or more dielectric layers on the upper and lower surfaces of the capacitance forming portion Ac, respectively, in the second direction, and basically serve to prevent damage to the internal electrodes due to physical or chemical stress. The first and second cover portions 112 and 113 may have the same configuration as that of the dielectric layer 111 except that the first and second cover portions 112 and 113 do not include internal electrodes. Each of the first and second cover portions 112 and 113 may have a thickness of 20 μm or less, but the present disclosure is not limited thereto.

The body 110 may include margin portions 114 and 115 disposed on a side surface of the capacitance forming portion Ac in the third direction. The margin portions 114 and 115 may include a first margin portion 114 disposed on the fifth surface 5 of the body 110 and a second margin portion 115 disposed on the sixth surface 6 of the body 110. The margin portions 114 and 115 may refer to a region between both ends of the internal electrodes 121 and 122 and a boundary surface of the body 110 in a cross-section of the body 110 taken in the second and third directions. The margin portions 114 and 115 may basically serve to prevent damage to the internal electrodes 121 and 122 due to physical or chemical stress. The margin portions 114 and 115 may include a material the same as or different from that of the dielectric layer 111. The margin portions 114 and 115 may be formed by forming the internal electrodes by applying a conductive paste on a ceramic green sheet except where the margin portions are to be formed. Alternatively, in order to suppress a step difference caused by the internal electrodes 121 and 122, after stacking, the internal electrodes 121 and 122 may be cut to be exposed to the fifth and sixth surfaces 5 and 6 of the body, and then a single dielectric layer or two or more dielectric layers may be stacked on both side surfaces of the capacitance forming portion Ac in the third direction to form the margin portions 114 and 115. The margin portions 114 and 115 may have a thickness of 20 μm or less, but the present disclosure is not limited thereto.

The internal electrodes 121 and 122 may be alternately disposed with the dielectric layer 111, and the plurality of first internal electrodes 121 and the plurality of second internal electrodes 122 may face each other with the dielectric layer 111 interposed therebetween. That is, the first and second internal electrodes 121 and 122 are a pair of electrodes having different polarities and are alternately exposed from the first and second surfaces 1 and 2 of the body 110 in the stacking direction of the dielectric layer 111. For example, each of the plurality of first internal electrodes 121 may be spaced apart from the second surface 2 and exposed through the first surface 1. In addition, each of the plurality of second internal electrodes 122 may be spaced apart from the first surface 1 and exposed from the second surface 2. The plurality of first internal electrodes 121 and the plurality of second internal electrodes 122 may be electrically isolated from each other by the dielectric layer 111 disposed therebetween. The plurality of first internal electrodes 121 and the plurality of second internal electrodes 122 may be alternately stacked in the second direction, but are not limited thereto, and may be alternately stacked in the third direction. The internal electrodes 121 and 122 may be formed by printing a conductive paste for internal electrodes including a conductive metal to have a predetermined thickness on a ceramic green sheet. When the ceramic green sheets on which the internal electrodes 121 and 122 are formed are alternately stacked and sintered, the capacitance forming portion Ac of the body 110 may be formed. A method for printing the conductive paste for internal electrodes may include a screen-printing method or a gravure printing method, but the present disclosure is not limited thereto. The conductive metals included in the internal electrodes 121 and 122 may be one or more of nickel (Ni), copper (Cu), palladium (Pd), silver (Ag), gold (Au), platinum (Pt), tin (Sn), tungsten (W), titanium (Ti), and alloys thereof, but the present disclosure is not limited thereto.

In this case, the thickness of the internal electrodes 121 and 122 may be 10 μm or less in consideration of the size and capacitance of the body 110, and 0.6 μm or less, and, more preferably 0.4 μm, for miniaturization and high capacitance of the multilayer electronic component 100, but the present disclosure is not limited thereto.

Here, the thickness of the internal electrodes 121 and 122 may refer to an average thickness of the internal electrodes 121 and 122. The average thickness of the internal electrodes 121 and 122 may be measured by scanning cross-sections of the body 110 in the first and second directions with a scanning electron microscope having a magnification of 10,000. More specifically, the average value may be measured by measuring the thickness at a plurality of points of one internal electrode, for example, at 30 points equally spaced in the first direction. If the average value is measured by extending the measurement of the average value to a plurality of internal electrodes, the average thickness of the internal electrodes may be more generalized.

The external electrodes 130 and 140 may include a first external electrode 130 disposed on the first surface 1 of the body 110 and connected to the plurality of first internal electrodes 121 and a second external electrode 140 disposed on the second surface 2 of the body 110 and connected to the plurality of second internal electrodes 122. The first and second external electrodes 130 and 140 may extend to portions of the third to sixth surfaces 3, 4, 5, and 6 of the body 110. In this case, the first external electrode 130 may include a first connection portion P1$a$ disposed on the first surface 1 of the body 110 and a first band portion P1$b$ extending to portions of the third to sixth surfaces 3, 4, 5, and 6 of the body 110, and the second external electrode 140 may include a second connection portion P2$a$ disposed on the second surface 2 of the body 110 and a second band portion P2$b$ extending to portions of the third to sixth surfaces 3, 4, 5, and 6 of the body 110. In the drawings, a structure in which the multilayer electronic component 100 has two external electrodes 130 and 140 is described, but the present disclosure is not limited thereto and the number or shape of the external electrodes 130 and 140 may be changed according to the form of the internal electrodes 121 and 122 or other purposes.

The first electrode layers 131 and 141 may be connected to the plurality of first and second internal electrodes 121 and 122 alternately exposed through the first and second surfaces 1 and 2 of the body 110 to secure electrical conduction between the first and second external electrodes 130 and 140 and the first and second internal electrodes 121 and 122. The first electrode layers 131 and 141 may include one or more of a conductive metal, and the conductive metal may include, for example, silver (Ag), lead (Pb), platinum (Pt), nickel (Ni), copper (Cu), and alloys thereof, and may include, more preferably, copper (Cu). The first electrode layers 131 and 141 may be formed by dipping the first and second surfaces 1 and 2 of the body 110 in a conductive paste including a conductive metal and glass and then performing sintering. Alternatively, the first electrode layers 131 and 141 may be formed by transferring a sheet including a conductive metal and glass. Accordingly, the first electrode layers 131 and 141 may be sintered electrodes including a conductive metal and glass.

Referring to FIG. 5, a portion of the first external electrode 130 is enlarged in region B, but here, the configurations of the first external electrode 130 and the second external electrode 140 are similar, merely having a difference in that the first external electrode 130 is connected to the first internal electrode 121 and the second external electrode 140 is connected to the second internal electrode 122, and thus, the first external electrode 130 will be mainly described, which is considered to include descriptions of the second external electrode 140.

The first resin electrode layer 132 is disposed on the first electrode layer 131 and includes a first conductive connecting portion 132$b$ including an intermetallic compound and a resin 132$c$. The resin 132$c$ may include a thermosetting resin having electrical insulation properties. In this case, the thermosetting resin may be, for example, an epoxy resin, but the present disclosure is not limited thereto.

The intermetallic compound refers to a compound having a specific crystal structure in which two or more metals are combined in a simple integer ratio. The intermetallic compound may be formed as at least any one of copper (Cu), silver (Ag), copper (Cu) coated with silver (Ag), and copper (Cu) coated with tin (Sn) reacts with tin (Sn), which is a low-melting-point metal having a melting point lower than that of a curing temperature of the resin 132$c$, or a tin (Sn) alloy. Accordingly, the intermetallic compound may include at least one of $Cu_6Sn_5$, $Cu_3Sn$, and $Ag_3Sn$. The intermetallic compound may form the first conductive connecting portion 132$b$ through metal bonding with the low-melting-point metal remaining after the intermetallic compound is formed. That is, the first conductive connecting portion 132$b$ may include a low-melting-point metal having a melting point lower than that of the curing temperature of the resin 132$c$. In this case, the low-melting-point metal may have a melting point of 300° C. or less, and more specifically, a melting point of 200° C. to 250° C.

At least a portion of the first conductive connecting portion 132$b$ may directly contact at least a portion of the first electrode layer 131 and at least a portion of the second resin electrode layer 133. Accordingly, electrical connectivity between the first electrode layer 131 and the second resin electrode layer 133 may be improved. In addition, it is possible to prevent lifting of an interface between the first electrode layer 131 and the first resin electrode layer 132.

As an example of a method of forming the first resin electrode layer 132, as described above, the first resin electrode layer 132 may be formed by applying a conductive resin composition including a metal powder and a thermosetting resin on the first electrode layer 131 and performing a curing heat treatment. In this case, the thermosetting resin may be a bisphenol A resin, a glycol epoxy resin, a novolak epoxy resin, or a resin liquid at room temperature due to a small molecular weight among derivatives thereof, but the present disclosure is not limited thereto. The conductive resin composition may be prepared by mixing silver (Ag) powder, copper (Cu) powder, silver (Ag)-coated copper (Cu) powder, tin (Sn)-based solder powder and thermosetting resin and then dispersing the mixture using a 3-roll mill. The tin (Sn)-based solder powder may include at least one of Sn, $Sn_{96.5}Ag_{3.0}Cu_{0.5}$, $Sn_{42}Bi_{58}$, and $Sn_{72}Bi_{28}$, but the present disclosure is not limited thereto.

The second resin electrode layer 133 is disposed on the first resin electrode layer 132 and includes a plurality of metal particles 133$a$ and a resin 133$c$. The plurality of metal particles 133$a$ may include, for example, one or more of copper (Cu), silver (Ag), nickel (Ni), palladium (Pd), platinum (Pt), gold (Au), lead (Pb), and alloys thereof, and may include, preferably, copper (Cu) and/or silver (Ag). The resin 133$c$ may include the same thermosetting resin as the resin of the first resin electrode layer 132, but the present disclosure is not limited thereto.

As described above, since the first conductive connecting portion 132$b$ of the first resin electrode layer 132 is directly connected to the first electrode layer 131, the flexural strength of the multilayer electronic component 100 may be reduced. In this case, the second resin electrode layer 133 may absorb tensile stress occurring in a mechanical or thermal environment when the multilayer electronic component 100 is mounted on a substrate, thereby preventing cracks from occurring. In addition, by including the second resin electrode layer 133 having a lower mechanical strength than the first resin electrode layer 132, the flexural strength of the multilayer electronic component 100 may be improved. The multilayer electronic component 100 according to an exemplary embodiment in the present disclosure includes the first and second resin electrode layers 132 and 133 to prevent the occurrence of lifting, which is a problem of the conventional resin electrode layer, and since the first resin electrode layer 132 includes the intermetallic compound, the flexural strength of the multilayer electronic component 100 may be improved. In this case, the second resin electrode layer 133 may not include an intermetallic compound. When the second resin electrode layer 133 does not include (is free of) the intermetallic compound, the second resin electrode layer 133 may be connected to the first resin electrode layer 132 by hopping conduction, rather than by metal bonding. Accordingly, the flexural strength of the multilayer electronic component 100 may be improved by adjusting the rigidity of the external electrode 130.

The second resin electrode layer 133 may be formed, for example, by applying a conductive resin composition including a metal powder and a thermosetting resin and performing a curing heat treatment. The thermosetting resin may include an epoxy resin, but is not limited thereto.

Referring to FIG. 3, according to an exemplary embodiment in the present disclosure, a ratio (L2/L1) of a length L2 of the second resin electrode layers 133 and 143 of the first and second band portions P1b and P2b in the first direction to a length L1 of the first electrode layers 131 and 141 of the first and second band portions P1b and P2b in the first direction may satisfy 1.5 to 4.

At this time, the length of the first electrode layers 131 and 141 of the first and second band portions P1b and P2b in the first direction may refer to a distance from the first surface 1 or the second surface 2 of the body 110 to an end of the first electrode layer 131 or 141, respectively, extending to portions of the third to sixth surfaces 3, 4, 5, and 6 of the body 110. In addition, the length of the second resin electrode layers 133 and 143 of the first and second band portions P1b and P2b in the first direction may refer to a distance to the ends of the second resin electrode layers 133 and 143 extending to portions of the third to sixth surfaces 3, 4, 5, and 6 of the body 110 from the first surface 1 or the second surface 2 of the body 110.

The length L2 of the second resin electrode layers 133 and 143 of the first and second band portions P1b and P2b in the first direction to the length L1 of the first electrode layers 131 and 141 of the first and second band portions P1b and P2b in the first direction may be measured from an image obtained by scanning first direction and second direction cross-sections of the multilayer electronic component 100 using a scanning electron microscope (SEM) or an optical microscope (OM). By satisfying the above conditions, the length L2 of the second resin electrode layers 133 and 143 of the first and second band portions P1b and P2b first direction may be maximized to improve the flexural strength of the multilayer electronic component 100.

Referring to FIG. 3, in an exemplary embodiment in the present disclosure, the external electrodes 130 and 140 may further include the second electrode layers 134 and 144 disposed on the second resin electrode layers 133 and 143 and including a conductive metal. The second electrode layers 134 and 144 may improve mounting characteristics. The second electrode layers 134 and 144 is not particularly limited in type and may be plating layers including nickel (Ni), tin (Sn), palladium (Pd), and/or alloys thereof and or may include a plurality of layers. The second electrode layers 134 and 144 may be, for example, a nickel (Ni) plating layer or a tin (Sn) plating layer, or have a structure in which a nickel (Ni) plating layer and a tin (Sn) plating layer are sequentially formed. In addition, the second electrode layers 134 and 144 may include a plurality of nickel (Ni) plating layers and/or a plurality of tin (Sn) plating layers.

Referring to FIG. 6, in an exemplary embodiment in the present disclosure, the first resin electrode layer 132 may further include a plurality of metal particles 132a. The plurality of metal particles 132a may include one or more of silver (Ag), copper (Cu), tin (Sn)-coated copper (Cu), and silver (Ag)-coated copper (Cu). The plurality of metal particles 132a may be differentiated from the intermetallic compound in the first resin electrode layer 132 by analyzing a micrograph of the first resin electrode layer by energy dispersive X-ray spectroscopy (EDS). The presence of the intermetallic compound may be indicated by overlapping regions of the elemental maps of two or more metals. The presence of the plurality of metal particles 132a may be indicated by a region in an elemental map of a metal that does not overlap with a corresponding region in an elemental map of another metal. Other methods and/or tools appreciated by one of ordinary skill in the art, even if not described in the present disclosure, may also be used. The plurality of metal particles 132a may be metal particles remaining after forming the intermetallic compound by reacting with a low-melting-point metal having a melting point lower than that of a curing temperature of the resin 132c in the curing heat treatment of the first resin electrode layer 132. In this case, the content of the plurality of metal particles 132a of the first resin electrode layer 132 may be less than the content of the plurality of metal particles 133a of the second resin electrode layer 133. The content of the plurality of metal particles 132a of the first resin electrode layer 132 may mean an area ratio of the metal particles 132a to the total area of the first resin electrode layer 132 by analyzing the cross-sectional image taken in a direction, perpendicular to the stacking direction of the plurality of internal electrodes, of the first resin electrode layer 132 with EDS. The content of the plurality of metal particles 133a of the second resin electrode layer 133 may mean an area ratio of the metal particles 133a to the total area of the second resin electrode layer 133 by analyzing the cross-sectional image taken in a direction, perpendicular to the stacking direction of the plurality of internal electrodes, of the second resin electrode layer 133 with EDS. The metal powder included in a conductive resin composition for forming the first resin electrode layer 132 mostly reacts with the tin (Sn)-based solder powder to form the first conductive connecting portion 132b, thereby preventing lifting between the first electrode layer 131 and the first resin electrode layer 132.

Referring to FIG. 7, in an exemplary embodiment in the present disclosure, a first interfacial layer 135 may be further provided between the first electrode layer 131 and the first resin electrode layer 132 and including an intermetallic compound. In this case, the intermetallic compound included in the first interfacial layer 135 may include $Cu_3Sn$. The first interfacial layer 135 may be formed as copper (Cu) included in the first electrode layer 131 reacts with tin (Sn) or a tin (Sn) alloy included in the first resin electrode layer 132 in the process of forming the first resin electrode layer 132 by applying and drying a conductive resin composition and performing a curing heat treatment thereon, but the present disclosure is not limited thereto.

The first interfacial layer 135 may serve to connect the first electrode layer 131 to the first conductive connecting portion 132b of the first resin electrode layer 132, and accordingly, excellent mechanical and electrical connectivity between the first electrode layer 131 and the first resin electrode layers 132 may be secured. In this case, the first interfacial layer 135 may be formed in the form of a plurality of islands, and the plurality of islands may be formed in the form of a layer.

Referring to FIG. 8, in an exemplary embodiment in the present disclosure, a second interfacial layer 136 may be further formed (disposed) between the first resin electrode layer 132 and the second resin electrode layer 133 and including an intermetallic compound. In this case, the intermetallic compound included in the second interfacial layer 136 may include at least one of $Ag_3Sn$, $Cu_3Sn$, and $Cu_6Sn_5$. The second interfacial layer 136 may be formed as tin (Sn) or a tin (Sn) alloy included in the first resin electrode layer 132 reacts with at least one of silver (Ag), copper (Cu), and silver (Ag)-coated copper included in the second resin electrode layer 133 during the process of forming the second resin electrode layer 133 by applying and drying the conductive resin composition and performing a curing heat treatment thereon, but the present disclosure is not limited thereto.

The second interfacial layer 136 may serve to connect the first resin electrode layer 132 to the second resin electrode layer 133, and accordingly, excellent mechanical and electrical connectivity between the first resin electrode layer 132 and the second resin electrode layer 133 may be secured.

Referring to FIG. 9, in an exemplary embodiment in the present disclosure, the second resin electrode layer 233 may further include a second conductive connecting portion 233b including an intermetallic compound, and the content of the intermetallic compound of the first resin electrode layer 232 may be higher than the content of the intermetallic compound of the second resin electrode layer 233. The content of the intermetallic compound of the first resin electrode layer 232 may mean an area ratio of the intermetallic compound to the total area of the first resin electrode layer 232 by analyzing the cross-sectional image of the first resin electrode layer 232 with EDS. The content of the intermetallic compound of the second resin electrode layer 233 may mean an area ratio of the intermetallic compound to the total area of the second resin electrode layer 233 by analyzing the cross-sectional image of the second resin electrode layer 233 with EDS. When the conductive resin composition forming the second resin electrode layer 233 includes tin (Sn) or a tin (Sn) alloy, which is a low-melting-point metal having a melting point lower than that of the curing temperature of the resin 233c, the intermetallic compound may be formed as any one of copper (Cu), silver (Ag), silver (Ag)-coated copper (Cu), and tin (Sn)-coated copper (Cu) included in the conductive resin composition reacts with tin (Sn). Accordingly, the intermetallic compound included in the second conductive connecting portion 233b may include at least one of $Cu_6Sn_5$, $Cu_3Sn$, and $Ag_3Sn$. The intermetallic compound may form the second conductive connecting portion 233b through a metal bond with the low-melting-point metal remaining after forming the intermetallic compound. That is, the second conductive connecting portion 233b may include a low-melting-point metal having a melting point lower than that of the curing temperature of the resin 233c.

At least a portion of the second conductive connecting portion 233b may directly contact at least a portion of the first resin electrode layer 232 and at least a portion of the second electrode layer 234. Accordingly, electrical connectivity between the first resin electrode layer 232 and the second electrode layer 234 may be improved.

In addition, the content of the intermetallic compound in the first resin electrode layer 232 is higher than the content of the intermetallic compound in the second resin electrode layer 233, so that the mechanical bonding force between the first electrode layer 231 and the first resin electrode layer 232 may be improved, thereby preventing a lifting defect. The second resin electrode layer 233, which has lower mechanical strength than that of the first resin electrode layer 232, may absorb tensile stress applied to the multilayer electronic component, thereby preventing cracks and improving the flexural strength of the multilayer electronic component.

At this time, based on a cross-section taken in a direction, perpendicular to the stacking direction of the plurality of internal electrodes, an area ratio of the intermetallic compound of the first resin electrode layer 232 may be higher than an area ratio of the intermetallic compound of the second resin electrode layer 233. As an example of a method of measuring the area ratio of the intermetallic compounds included in the first resin electrode layer 232 and the second resin electrode layer 233, a region of the third direction length×first direction length=60 μm×20 μm from a third direction center point of the first resin electrode layer 232 and the second resin electrode layer 233 arranged on the first surface 1 of the body based on the first and third direction cross-section at a ½ point of the length of the external electrode 230 in the second direction may be imaged using an optical microscope (OM) or a scanning electron microscope (SEM) and measured through a computer program such as ImageJ, but the present disclosure is not limited thereto.

An example of a method of controlling the content of the intermetallic compounds in the first resin electrode layer 232 and the second resin electrode layer 233 will be described. If the content of the metal powder added to the conductive resin composition forming the second resin electrode layer 233 is less than the content of the metal powder added to the conductive resin composition forming the first resin electrode layer 232, the content of the intermetallic compound of the second resin electrode layer 233 may be lower than the content of the intermetallic compound of the first resin electrode layer 232. Alternatively, if the content of the silver (Ag) powder added to the conductive resin composition forming the second resin electrode layer 233 is less than the content of the silver (Ag) powder added to the conductive resin composition forming the first resin electrode layer 232, the content of the intermetallic compound in the second resin electrode layer 233 may be lower than the content of the intermetallic compound in the first resin electrode layer 232. Alternatively, if the content of tin (Sn)-based solder powder added to the conductive resin composition for forming the second resin electrode layer 233 is less than tin (Sn)-based solder powder added to the conductive resin composition forming the first resin electrode layer 232, the content of the intermetallic compound in the second resin electrode layer 233 may be lower than the content of the intermetallic compound in the first resin electrode layer 232. However, the present disclosure is not limited thereto.

At this time, as described above, the first interfacial layer 235 may be further included between the first electrode layer 231 and the first resin electrode layer 232 and the intermetallic compound included in the first interfacial layer 235 may include $Cu_3Sn$. The first interfacial layer 235 may serve to connect the first electrode layer 231 and the first conductive connecting portion 232b of the first resin electrode layer 232.

Referring to FIG. 10, an exemplary embodiment in the present disclosure includes a body 310 including a dielectric layer 311 and a plurality of internal electrodes 321 and 322 stacked with the dielectric layer 311 therebetween. The first electrode layers 331 and 341 of the first and second band portions P1b and P2b may be in contact with the second electrode layers 334 and 344 of the first and second band portions P1b and P2b. That is, the lengths of the first electrode layers 331 and 341 of the first and second band portions P1b and P2b in the first direction may be longer than the lengths of the first resin electrode layers 332 and 342 and the second resin electrode layers 333 and 343 of the first and second band portions P1b and P2b in the first direction. Accordingly, the first and second electrode layers 331, 341, 334, and 344 having better electrical connectivity than the resin electrode layer contact each other, thereby improving the electrical connectivity of the external electrodes 330 and 340.

Figure 11:
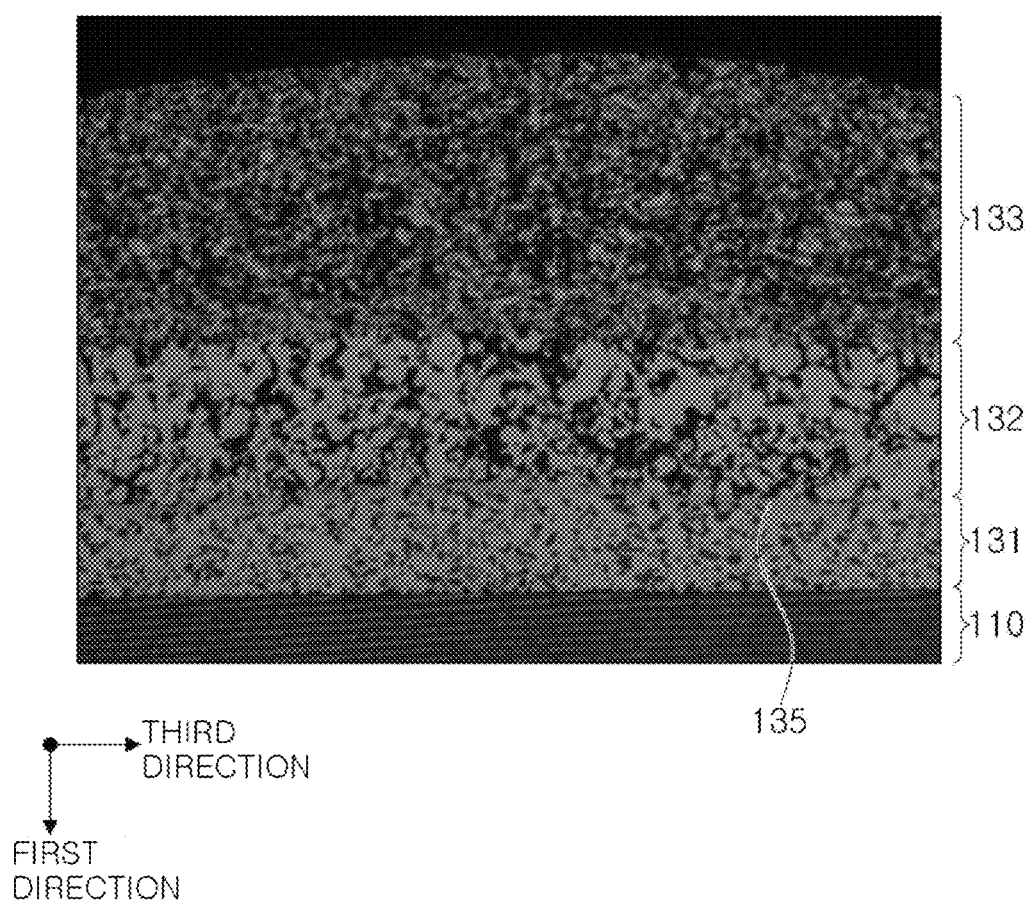
FIG. 11 is an image of a cross-section of an external electrode of a multilayer electronic component, captured with an optical microscope (OM), according to an exemplary embodiment in the present disclosure.

FIG. 11 is an image of a cross-section of an external electrode of a multilayer electronic component, captured with an optical microscope (OM), according to an exemplary embodiment in the present disclosure. More specifically, the image of FIG. 11 is obtained by capturing first direction and third direction cross-section of the external electrode 130 of which the second resin electrode layer 133 does not include an intermetallic compound. The first resin electrode layer 132 includes a first conductive connecting portion 132b forming an internal connection structure, and a region indicated in black in the image in the first resin electrode layer 132 includes the resin 132c. In addition, the second resin electrode layer 133 includes a plurality of metal particles not forming an internal connection structure, and a region indicated in black in the image in the second resin electrode layer 133 includes the resin 133c. The fact that the second resin electrode layer 133 does not include the intermetallic compound may be confirmed by analyzing the optical microscope image by energy dispersive X-ray spectroscopy (EDS).

Figure 12:
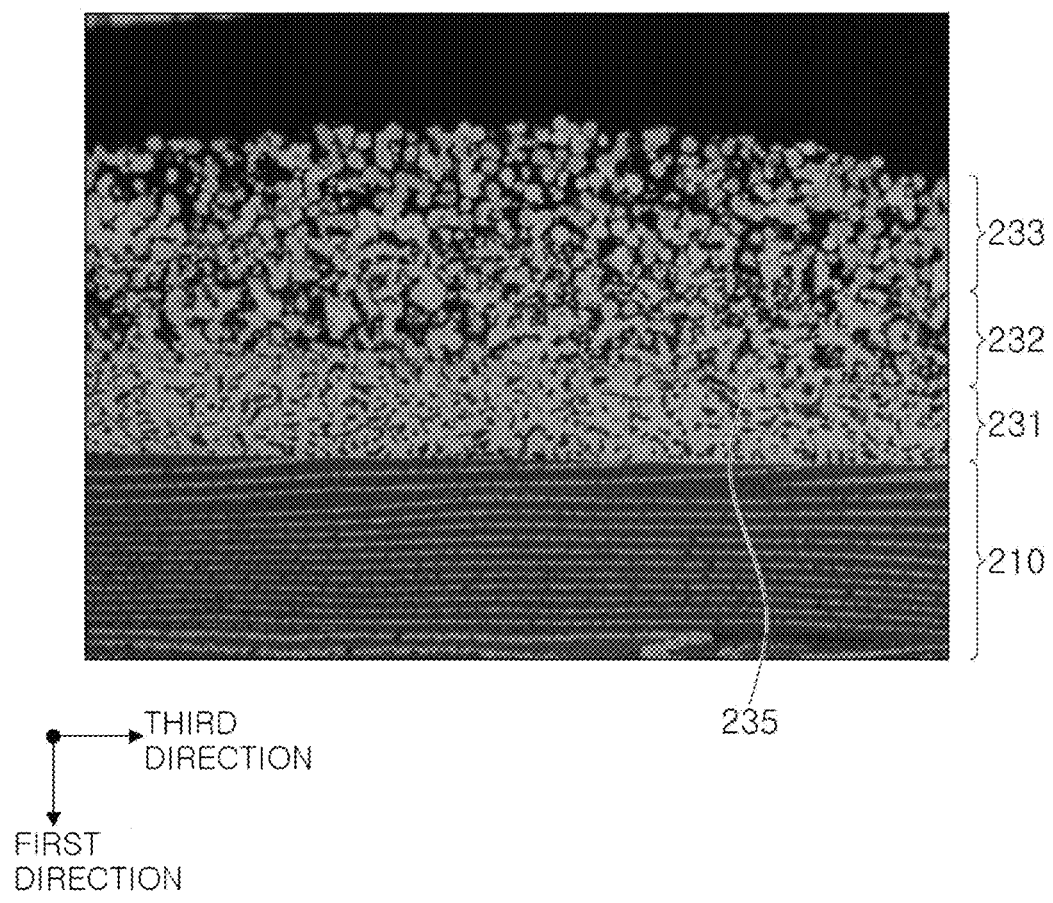
FIG. 12 is an image of a cross-section of an external electrode of a multilayer electronic component, captured with an OM, according to an exemplary embodiment in the present disclosure.

FIG. 12 is an image obtained by imaging a cross-section of an external electrode of a multilayer electronic component according to an exemplary embodiment in the present disclosure with an optical microscope. More specifically, FIG. 12 is an image obtained by capturing a first direction and third direction cross-section of the external electrode 230 in which the second resin electrode layer 233 includes the second conductive connecting portion 233b including an intermetallic compound. At this time, referring to FIG. 12, it can be seen that the first conductive connecting portion 232b forming the internal connection structure of the first resin electrode layer 232 is formed to be denser than the second conductive connecting portion 233b forming the internal connection structure of the second resin electrode layer 233. Accordingly, it can be seen that the area ratio of the intermetallic compound of the first resin electrode layer 232 is higher than the area ratio of the intermetallic compound of the second resin electrode layer 233. Alternatively, the optical microscope images may be compared by measuring the area ratios of the intermetallic compounds of the first resin electrode layer 232 and the second resin electrode layer 233 through a computer program such as ImageJ, but the present disclosure is not limited thereto.

As set forth above, one of the various effects of the present disclosure is to suppress the occurrence of lifting at the interface between the sintered electrode layer and the resin electrode layer due to outgas occurring from the resin electrode layer when reflow is applied.

One of the various effects of the present disclosure is to improve electrical connectivity of the external electrode including the resin electrode layer.

One of the various effects of the present disclosure is to improve the flexural strength of a multilayer electronic component lowered by a resin electrode layer including an intermetallic compound.

While example exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including a dielectric layer and a plurality of internal electrodes stacked with the dielectric layer interposed therebetween; and
external electrodes disposed outside the body,
wherein the external electrodes include:
a first electrode layer connected to the internal electrodes and including a first conductive metal;
a first resin electrode layer disposed on the first electrode layer and including a first conductive connecting portion including a first intermetallic compound and a first resin;
a second resin electrode layer disposed on the first resin electrode layer and including a plurality of second metal particles and a second resin; and
a second interfacial layer disposed between the first resin electrode layer and the second resin electrode layer and including a third intermetallic compound.

2. The multilayer electronic component of claim 1, wherein the second resin electrode layer is free of an intermetallic compound.

3. The multilayer electronic component of claim 1, wherein the first intermetallic compound includes at least one of $Cu_6Sn_5$, $Cu_3Sn$, or $Ag_3Sn$.

4. The multilayer electronic component of claim 1, wherein
the first resin electrode layer further includes a plurality of first metal particles, and
a content of the plurality of first metal particles in the first resin electrode layer is less than a content of the plurality of second metal particles in the second resin electrode layer.

5. The multilayer electronic component of claim 1, wherein a first interfacial layer is disposed between the first electrode layer and the first resin electrode layer and includes a second intermetallic compound distinct from the first intermetallic compound.

6. The multilayer electronic component of claim 1, wherein the third intermetallic compound included in the second interfacial layer includes at least one of $Ag_3Sn$, $Cu_3Sn$, or $Cu_6Sn_5$.

7. The multilayer electronic component of claim 1, wherein
the second resin electrode layer further includes a second conductive connecting portion including a fourth intermetallic compound, and
a content of the first intermetallic compound in the first resin electrode layer is higher than a content of the fourth intermetallic compound in the second resin electrode layer.

8. The multilayer electronic component of claim 7, wherein, based on a cross-section of the external electrodes taken in a direction perpendicular to a stacking direction of the plurality of internal electrodes, an area ratio of the first intermetallic compound of the first resin electrode layer is higher than an area ratio of the fourth intermetallic compound of the second resin electrode layer.

9. The multilayer electronic component of claim 1, wherein the external electrodes further include a second electrode layer disposed on the second resin electrode layer and including a second conductive metal.

10. The multilayer electronic component of claim 9, wherein the second electrode layer has a multilayer structure including a first layer including nickel (Ni) as the second conductive metal and a second layer including tin (Sn) as the second conductive metal.

11. The multilayer electronic component of claim 9, wherein
the body further includes first and second surfaces opposing each other in a first direction, third and fourth surfaces connected to the first and second surfaces and opposing each other in a second direction, and fifth and sixth surfaces connected to the first to fourth surfaces and opposing each other in a third direction,
the external electrodes include a first external electrode disposed on the first surface of the body and a second external electrode disposed on the second surface of the body,
wherein the first external electrode includes a first band portion extending to first portions of the third to sixth surfaces of the body, and
the second external electrode includes a second band portion extending to second portions of the third to sixth surfaces of the body.

12. The multilayer electronic component of claim 11, wherein a ratio of a length of the second resin electrode layer of the first and second band portions in the first direction to a length of the first electrode layer of the first and second band portions in the first direction is 1.5 to 4.

13. The multilayer electronic component of claim 11, wherein the first electrode layer of the first and second band portions is in contact with the second electrode layer of the first and second band portions.

14. The multilayer electronic component of claim 1, wherein the first conductive connecting portion further includes a low-melting-point metal having a lower melting point than a curing temperature of the resin.

15. The multilayer electronic component of claim 5, wherein the second intermetallic compound included in the first interfacial layer includes $Cu_3Sn$.

16. A multilayer electronic component comprising:
a body including a dielectric layer and a plurality of internal electrodes stacked with the dielectric layer interposed therebetween; and
external electrodes disposed outside the body,
wherein the external electrodes include:
a first electrode layer connected to the internal electrodes and including a first conductive metal;
a first resin electrode layer disposed on the first electrode layer and including a first conductive connecting portion including a first intermetallic compound and a first resin;
a second resin electrode layer disposed on the first resin electrode layer and including a plurality of second metal particles and a second resin; and
a second interfacial layer disposed between the first resin electrode layer and the second resin electrode layer and including a third intermetallic compound,
wherein an end of the first electrode layer extends beyond an end of the second resin electrode layer.

17. The multilayer electronic component of claim 16, wherein the first electrode layer further includes glass.

18. The multilayer electronic component of claim 16, wherein
the body further includes first and second surfaces opposing each other in a first direction, third and fourth surfaces connected to the first and second surfaces and opposing each other in a second direction, and fifth and sixth surfaces connected to the first to fourth surfaces and opposing each other in a third direction,
the external electrodes include a first external electrode disposed on the first surface of the body and a second external electrode disposed on the second surface of the body,
wherein the first external electrode includes a first band portion extending to first portions of the third to sixth surfaces of the body, and
the second external electrode includes a second band portion extending to second portions of the third to sixth surfaces of the body.

19. The multilayer electronic component of claim 16, wherein a length of the first electrode layer of the first and second band portions in the first direction is longer than a length of the second resin electrode layer of the first and second band portions in the first direction.

20. The multilayer electronic component of claim 16, wherein
the second resin electrode layer further includes a second conductive connecting portion including a fourth intermetallic compound.

21. The multilayer electronic component of claim 20, wherein, based on a cross-section of the external electrodes taken in a direction perpendicular to a stacking direction of the plurality of internal electrodes, an area ratio of the first intermetallic compound of the first resin electrode layer is higher than an area ratio of the fourth intermetallic compound of the second resin electrode layer.

22. The multilayer electronic component of claim 16, wherein a first interfacial layer is disposed between the first electrode layer and the first resin electrode layer and includes a second intermetallic compound distinct from the first intermetallic compound.

* * * * *